United States Patent Office

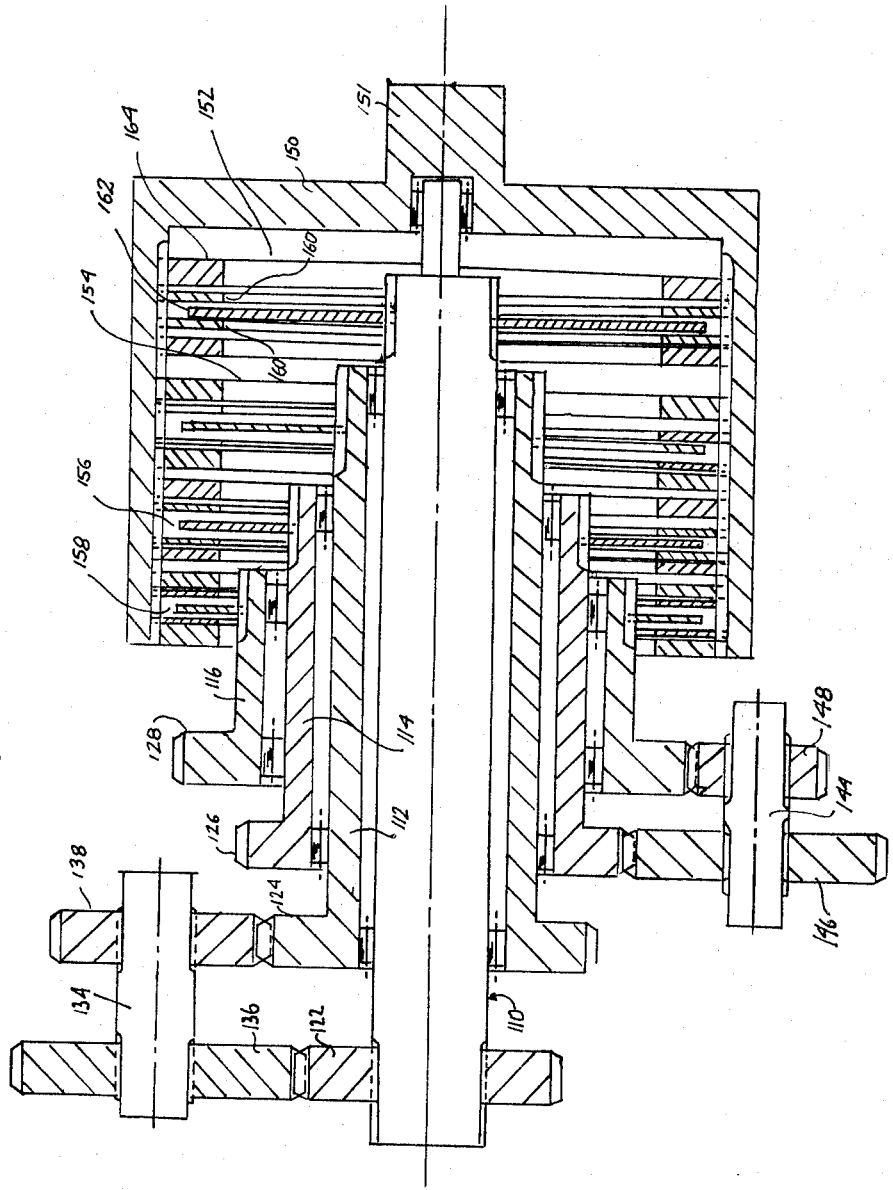

3,389,614
Patented June 25, 1968

3,389,614
TRANSMISSION
Shmuel Shiber, 18 Tamar St., and Benjamin Fishler, 113 Weizmann St., both of Tel Aviv, Israel
Filed Apr. 14, 1966, Ser. No. 542,600
Claims priority, application Israel, Apr. 19, 1965, 23,382; Feb. 14, 1966, 25,169
1 Claim. (Cl. 74—330)

ABSTRACT OF THE DISCLOSURE

A transmission having a central shaft and three nested sleeve shafts, as well as at least two counter shafts one of which is power-transmittingly connected to the central shaft and to one of the sleeve shafts by different transmission ratios and the other of which counter shafts is power-transmittingly connected to the remaining sleeve shafts by different transmission ratios. A rotary cage is arranged coaxially with the central and sleeve shafts, there being a plurality of selectively actuable clutches for power-transmittingly coupling the cage either to the central shaft or to the sleeve shaft to which the one counter shaft is connected and for also power-transmittingly coupling the cage to either of the remaining sleeve shafts. In this way, the counter shafts may, depending on which two of the clutches are actuated, be power-transmittingly coupled to each other by any one of several different transmission ratios.

---

The present invention relates to transmissions. More particularly, the present invention relates to a multispeed power shifting type transmission which is suitable for use in motor vehicles, power-driven machinery, and other systems in which the rotary power is to be transmitted from one component to another.

There exist various transmissions, designed to transmit at more than one gear ratio, which transmissions are relatively complicated, which incorporate a large number of moving parts, and which are relatively bulky, and it is the primary object of the present invention to overcome these drawbacks, namely, to provide a rotary transmission which is relatively compact but still able to transmit at any one of at least three different transmission ratios.

With the above objects in view, the present invention resides, basically, in a transmission incorporating a central shaft and at least three nested sleeve shafts which are coaxial with each other and with the central shaft. At least two counter shafts are arranged parallel to and spaced from the common axis of the central and sleeve shafts, one counter shaft being power-transmittingly connected to the central shaft and to one sleeve shaft and the other counter shaft being power-transmittingly connected to the remaining sleeve shafts. The transmission further includes rotary cage means which are arranged coaxially with the central and sleeve shafts, there being a plurality of selectively actuatable clutch means for power-transmittingly coupling any of the central and sleeve shafts to the cage means. Thus, by actuating one of the two clutches which couple the cage means with the central shaft and with the sleeve shaft to which the first-mentioned counter shaft is connected, and by also actuating one of the two clutches which couple the cage means with the remaining sleeve shafts, the two counter shafts will be power-transmittingly coupled to each other, the transmission ratio being dependent on which two of the respective clutches are actuated.

In this way, the transmission can provide at least four different transmission ratios from one counter shaft to the other, while keeping the overall length as well as the overall outside dimensions of the transmission to a minimum.

Additional objects and advantages of the present invention will become apparent upon consideration of the following description when taken in conjunction with the accompanying drawings in which:

FIGURE 2 is a sectional view of another embodiment of a transmission according to the present invention.

Figure 1:
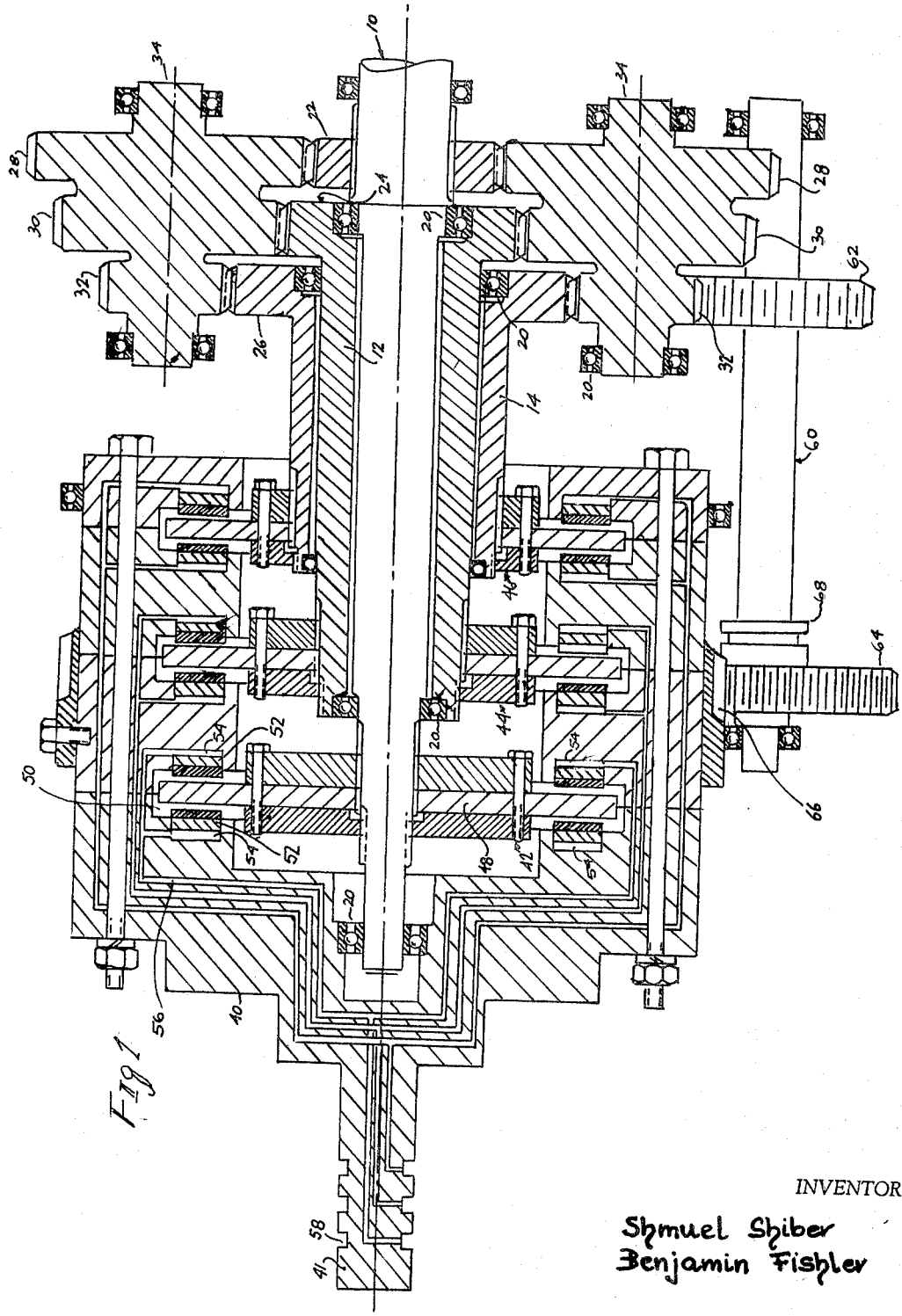
FIGURE 1 is a sectional view of one embodiment of a transmission according to the present invention.

Referring now to the drawings and first to FIGURE 1 thereof, the same shows a transmission comprising a rotatable central shaft 10 having arranged thereon two sleeve shafts 12 and 14, the same being telescoped or nested one within the other with all of these shafts 10, 12, 14, being coaxial. The shaft 12 is shorter than and freely rotatable with respect to shaft 10 and shaft 14 is shorter than and freely rotatable with respect to shaft 12, there being ball bearings or other bearings 20 interposed between the respective shafts.

The central shaft 10 carries a gear 22, the sleeve shaft 12 carries a gear 24 and the shaft 14 carries a gear 26. The gear 22, 24, 26, which may be in the form of gear rings integral with the respective shafts, are in mesh with gears 28, 30, 32, respectively of at least one rotatable counter shaft 34, the embodiment in FIGURE 1 actually showing two such counter shafts, each of which is arranged for rotation about an axis parallel to and spaced from the common axis of the central and sleeve shafts 10, 12, 14. Since, as shown, the gear trains 22/28, 24/30 and 26/32 are of different sizes, the central and sleeve shafts are power-transmittingly connected with each counter shaft by different gear ratios.

The transmission further comprises a rotary cage 40 which is arranged coaxially with the central and sleeve shafts, this cage 40 being power-transmittingly connectible to any of the shafts 10, 12, 14, by means of selectively actuatable clutches 42, 44, 46, respectively. These clutches are of similar construction so that the details of only the clutch 42 will be described. This clutch incorporates a disc 48 which is securely fastened to the central shaft 10, the outer peripheral edge of this disc extending into an inner annular groove 50 of the cage 40. The cage carries two rows of peripherally distributed slidable pistons 52, the pistons of each row being movable in opposite axial directions, for clampingly engaging the opposite faces of the disc 48. This occurs when the cylinders 54 within which the pistons slide are filled with a fluid under pressure, the same being fed to the cylinder via conduits 56 which open in an annular groove 58 to which pressure fluid may be supplied in a manner conventional in the art and therefore not shown.

Thus, when pressure fluid is supplied to the groove 58 and is made to flow through the conduits 56, the pistons 52 will be made to press against the plate 48, thereby to couple the central shaft 10 and the cage 40 together for rotation. When the pressure is released, the coupling will cease to be effective; if desired, a return springs (not shown) may be provided for assisting the disengagement of the pistons 52 from the plate 48 when the fluid pressure is relieved.

The sleeve shafts 12 and 14 carry clutch plates comparable to the plate 48 described in connection with shaft 10, and these clutch plates are engaged by hydraulic means similar to those just described. Thus, cage 40 can be power-transmittingly coupled to any one of the shafts 10, 12 and 14, as desired, so that any one of three desired transmission ratios can be established between the central shaft 10 and the cage 40, namely, a direct drive if the clutch 42 is actuated, a drive involving the counter shafts 34 and the sleeve shaft 12 if the clutch 44 is actuated, and a drive involving the counter shafts 34 and the sleeve shaft 14 if the clutch 46 is actuated.

FIGURE 1 also shows a reversing gear, the same incorporating a rotatable shaft 60 carrying a gear 62 in mesh with, for example, a gear 32 of one of the counter shafts 34. The shaft 60 is connectible to a gear 64 which is in mesh with a ring 66 carried by the cage 40, by means of a synchromesh or other suitable device 68, which may be actuated whenever none of the clutch devices 42, 44, 46 is actuated.

While the above-described embodiment has been shown as incorporating hydraulic clutches, it will be appreciated that any other suitable type of clutch may be provided, e.g., mechanical, electric, electromagnetic, magnetic power, and so on.

In practice, the central shaft 10, either or both of the counter shafts 34, or the cage 40, which itself has a shaft-like extension 41, may serve as either the input or the output of the transmission.

In the embodiment of FIGURE 2, the central shaft 110 carries a plurality of three coaxial, nested and successively shorter sleeve shafts 112, 114, 116, the central shaft 110 carrying a gear 122 and the sleeve shafts 112, 114, 116, carrying gears 124, 126, 128, respectively. The counter shaft means of the transmission includes two rotatable counter shafts 134 and 144, the former carrying a gear 136 in mesh with gear 122 and a gear 138 in mesh with gear 124, and the latter carrying a gear 146 in mesh with gear 126 and a gear 148 in mesh with gear 128, preferably the gear trains 122/136, 124/138 and the gear trains 126/146, 128/148 being of different sizes.

The transmission further comprises a cage 150, there being four clutches 152, 154, 156, 158, for coupling the cage 150 to the shafts 110, 112, 114, 116, respectively. Each clutch includes a set of clutch plates 160 carried by the cage and a clutch plate 162 carried by the respective shaft, there being a suitable actuator device 164, shown schematically only, for pressing the plates 160 and 162 to each other, thereby to couple the cage with the shaft whose clutch has been actuated.

Thus, there is obtained a so-called "two-by-two" transmission, in, that, depending on which of the counter shafts is the input and which the output, an appropriate transmission ratio may be obtained by actuating one of the two clutches 152 and 154—these being the clutches associated with the shafts 110 and 112 that are power-transmittingly connected to the counter shaft 134—and one of the two clutches 156 and 158—these being the clutches associated with the shafts 114 and 116 that are power-transmittingly connected to the other counter shaft 144.

As in the embodiment of FIGURE 1, any one of the central and counter shafts, and also cage 150, with its shaft-like extension 151, may serve as either the input or output of the transmission.

The embodiment of FIGURE 2, may be modified by providing any other suitable type of clutch devices. Moreover, suitable reverse gearing (not shown) may be provided, as described in conjunction with FIGURE 1.

In each of the above transmissions, the clutches may be operated manually or by conventional automatic or semi-automatic servo devices.

It will thus be seen that, in accordance with the present invention, there is provided a transmission incorporating a central shaft carrying at least two nested sleeve shafts, which are connectible to the cage by suitable clutch means. This arrangement allows the overall axial and transverse dimensions of the transmission to be kept relatively small, while still providing at least three different transmission ratios.

It will be understood that the above description of the present invention is susceptible to various modifications, changes, and adaptations, and the same are intended to be comprehended within the meaning and range of equivalents of the appended claim.

What is claimed is:
1. A transmission comprising, in combination:
 (a) a central shaft;
 (b) at least three nested sleeve shafts coaxial with each other and with said central shaft;
 (c) at least two counter shafts each parallel to and spaced from the common axis of said central and sleeve shafts, one of said counter shafts being power-transmittingly connected to said central shaft and to one of said sleeve shafts by different transmission ratios and the other of said counter shafts being power-transmittingly connected to the remaining sleeve shafts by different transmission ratios;
 (d) rotary cage means arranged coaxially with said central and sleeve shafts; and
 (e) a plurality of selectively actuatable clutch means for power-transmittingly coupling said cage means either to said central shaft or to said one sleeve shaft, as desired, and for power-transmittingly coupling said cage means to either of said remaining sleeve shafts, in consequence of which said counter shafts may, depending on which of said plurality of selectively actuatable clutch means are actuated, be power-transmittingly coupled to each other by any one of a plurality of different transmission ratios.

References Cited

UNITED STATES PATENTS

| | | | |
|---|---|---|---|
| 2,427,432 | 9/1947 | Wilhelmy | 74—330 |
| 3,138,965 | 6/1964 | Brey et al. | 74—331 |
| 3,175,411 | 3/1965 | McFarland | 74—330 |

FRED C. MATTERN, JR., *Primary Examiner.*

DONLEY J. STOCKING, *Examiner.*

HENRY S. LAYTON, *Assistant Examiner.*